United States Patent Office 3,318,727
Patented May 9, 1967

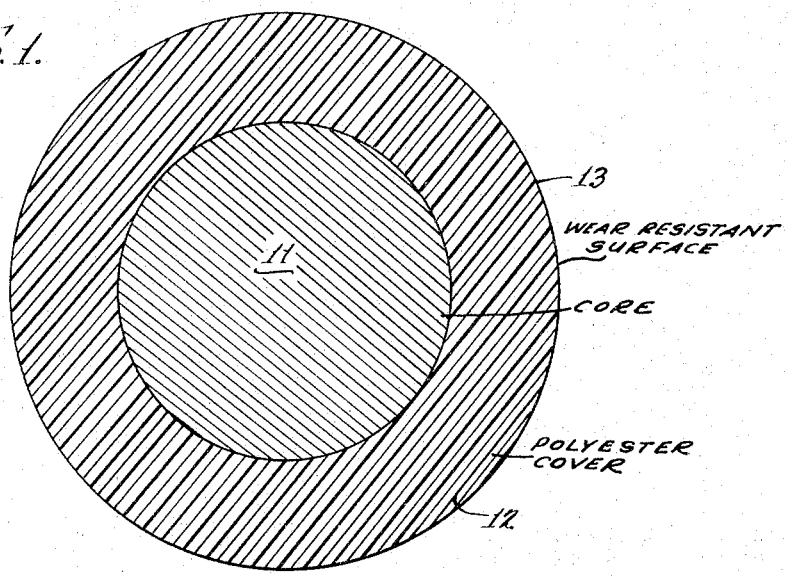
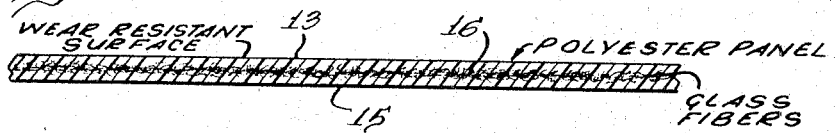
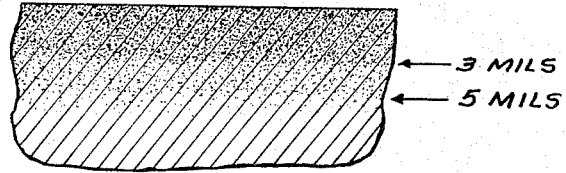

3,318,727
SCRATCH AND WEAR RESISTANT CURED
POLYESTER SURFACES
Herman V. Boenig, Lexington, Ky., and Robert S. Barnes and Franz P. Kuhner, Muskegon, Mich., assignors to Brunswick Corporation, a corporation of Delaware
Filed Sept. 27, 1965, Ser. No. 490,620
27 Claims. (Cl. 117—118)

This application is a continuation-in-part of our copending applications Ser. No. 315,699, filed Oct. 11, 1963, entitled, "Scratch and Wear Resistant Cured Polyester Products," now abandoned; and Ser. No. 315,687, filed Oct. 11, 1963, entitled, "Polyester Article Having Wear Resistant Surface of Cross-Linked Polyester Organic Isocyanate Reaction Product," now abandoned. Applications Ser. No. 315,699 and Ser. No. 315,687 are in turn continuations-in-part of our application Ser. No. 205,194, now abandoned.

This invention relates to plastic surfaces of articles such as bowling balls and improvement of their surface wear properties. The invention further relates to improving such surface wear properties of plastic articles and especially bowling balls.

Cured plastic articles such as plastic castings and laminates, e.g. reinforced by glass fibers or other materials, have recently entered new fields of application due to their physical and chemical properties. Although such plastic articles, and especially polyester castings and laminates, perform very satisfactorily in many applications, their field of use would be considerably broader except for their low resistance to physical wear, especially as expressed in terms of scratch or abrasion resistance. The cured polyester articles, for example, are often not competitive with highly scratch-resistant plastics, such as filled melamine-formaldehyde resins, certain urethane elastomers, and the like. Thus, it becomes desirable for increasing the breadth of application of cured polyesters to improve the resistance of cured polyesters to physical wear so that polyesters may advantageously be used as flooring, counter-tops, writing desks, nose cones, bowling balls, billiard balls, etc. It is especially important for application of cured polyesters in the making of bowling balls and billiard balls to improve the surface wear characteristics. Also, the more highly scratch-resistant plastics, as well as those with lower scratch resistance, may find still broader application with even greater scratch resistant properties.

It is an object of this invention to provide plastic balls and other articles with improved surface wear characteristics, and especially to provide polyester balls having increased wear resistance.

Another object of this invention is to provide for increasing the wear resistance of plastic surfaces such as ball surfaces.

Still another object of this invention is to provide a wear resistant surface on an article having a polyester outer portion, which surface is formed by the reaction product of an isocyanate with the surface polyester.

Another object of this invention is to provide a new and useful wear resistance surface, which surface is formed by the cross-linking of reactive surface groups.

A further object of this invention is to provide a ball having a plastic, e.g. polyester, outer portion and a wear resistant surface on the outer portion formed by treating the polyester wih a composition containing reactive isocyanate groups and thereafter treating to cross-link the reactive isocyanate groups.

An additional object of this invention is to provide improved surface wear resistance of a polyester bowling ball cover by reacting the surface of the cover with aryl-, alkyl-, or aryl-alkyl-polyisocyanates and treating the reacted surface with fluid water or a polyfunctional composition.

A further object of this invention is to provide a bowling ball having a core and a polyester cover surrounding the core and a wear resistant surface on the cover according to the foregoing objects.

Other objects of this invention will be apparent to those in the art from the following descriptions and the drawings in which:

FIG. 1 illustrates an article of the present invention in the form of a bowling ball having a hard core 11 and a polyester cover 12 and having a wear resistant surface 13 in accordance herewith;

FIG. 2 is a cross-section through a cast polyester panel including polyester 15 reinforced by glass fibers 16 and having a wear resistant surface 13 in accordance herewith; and FIG. 3 is an enlarged portion of the surface layer 13 of the articles of FIGS. 1 and 2 and diagrammatically illustrating the wear resistance of the surface portion of the polyester extending and decreasing interiorly from the polyester surface as indicated by stippling which becomes less dense interiorly, e.g. at depths of 3 mils and 5 mils.

One aspect of this invention is the discovery that plastic surfaces and especially polyester surfaces, such as are present on polyester balls, may be treated with a composition capable of disposing reactive groups thereon, e.g. isocyanate such as either monoisocyanate or polyisocyanate, including diisocyanate. The surface resulting from such treatment is a hardened surface of improved wear resistance in terms of scratch and abrasion resistance.

Accordingly, wear resistance, in terms of scratch and abrasion resistance of plastic surfaces and especially polyester surfaces, such as are present on polyester bowling balls, is improved by treatment with monomeric isocyanate, i.e. either monoisocyanate or polyisocyanate, including diisocyanate. Preferably, the isocyanate is used in solution in a suitable solvent. The article resulting from treatment in accordance herewith has a wear resistant surface which is composed of an isocyanate reaction product with the polyester at the surface of the polyester. The wear resistant surface also includes any subsurface wear resistance from subsurface reaction of the isocyanate. The reaction product is a product of chemical and/or physical reaction, e.g. sorption, of the isocyanate with the polyester.

We have also discovered that isocyanate treated polyester surfaces, may be further improved with respect to hardness or scratch resistance by treatment with a crosslinking agent such as water or a compound having a plurality of functional groups, reactable with the isocyanate treated surface.

The isocyanate can be an organic compound having a structure including an isocyanate group, i.e. —NCO. Exemplary of suitable monomeric isocyanates are toluene diisocyanate (such as Mondur TD–80, Mobay Chemical Company), naphthalene diisocyanate, p-chlorophenyl isocyanate, p-tolyl isocyanate, p-biphenylyl isocyanate (p-xenyl isocyanate), phenyl isocyanate, p-carboxyphenyl isocyanate, alphanaphthyl isocyanate, p,p'-diisocyanate-biphenyl, 1,4-diisocyanate benzene, 2,5-dichlorophenyl isocyanate, o-biphenylyl isocyanate (o-xenyl isocyanate), o-chlorophenyl isocyanate, bitolylene diisocyanate, p,p'-diisocyanate-diphenylmethane, methyl isocyanate, ethyl isocyanate and higher homologues such as alkyl isocyanates preparable by action of the corresponding alkyl iodide on silver cyanate or by oxidation of the corresponding isonitrile to form such alkyl isocyanates, as, for example, octadecyl isocyanate. Additional isocyanates include hexamethylene diisocyanate, decamethylene diisocyanate, ethylene diisocyanate, trimethylene diisocyanate, tetramethylene diisocyanate, propylene - 1,2 - diisocyanate, diphenyl - 4,4' - diisocyanate, butane-1,2,2-triisocyanate, 2,4,6-toluene triisocyanate, etc. We have found aryl polyisocyanates, including diisocyanate, to be excellent for use in improving the polyester wear resistance. The isocyanates are monomeric as distinguished from the polymers of polyurethane coatings such as lacquers and the like.

In a preferred procedure for further improving surface wear resistance of a surface, the isocyanate treated surface is further surface-treated with a cross-linking agent such as water or a polyfunctional cross-linking compound in either liquid or vapor phase. This may be done with or without previous drying or curing of the surface. The cross-linking agent is selected with respect to the reactive groups of the surface and is capable of cross-linking the reactive groups. Such cross-linking agents are well known to those in the art and include, but are not limited to, the organic polyhydric, polyamino, hydroxy amino, etc., compounds as well as water and the inorganic polyhalo compounds. Other such agents will be apparent to those in the art. The post-treatment temperatures and times are not critical, the usual such conditions for use with a particular cross-linking agent being generally usable, sufficient to effect the cross-linking. Preferred temperatures, for convenience, range from room temperature to 100° C. After treatment with water or other cross-linking agent the surface is preferably dried, or the surface may be cured at higher temperature, if desired.

We have treated polyester surfaces successfully in accordance herewith and we believe that the treatment is also effective with other plastic surfaces, especially surfaces of plastics having active hydrogen atoms for reaction of isocyanate groups therewith. The preferred plastics are polyesters, and the plastic will be referred to hereinbelow as "polyester," although it is to be understood that other plastics can be used.

The isocyanate treated surfaces apparently have free isocyanate groups, e.g. pendant from molecules which are either chemically or physically bonded to the surface, e.g. by chemical reaction or by sorption affinity, including absorption and adsorption.

The polyester resin can be any polyester of a polycarboxylic acid and polyhydric alcohol, such as, for example, polyesters of succinic, maleic, fumaric, tartaric, malic, citric, glutaric, adipic, pimelic, suberic, sebacic, phthalic, terephthalic, isophethalic, benzophenone dicarboxylic, chlorosuccinic, etc., acids and such polyhydric alcohols as ethylene glycol, glycerol, propylene glycol, butane-2,3-diol, sorbitol, pentaerythritol, propane-1,2-diol and the like. Of course, such polyesters may be modified as desired with other resins, fillers, inhibitors, pigments, etc., as is well known in the art. Such resins used in molding are often thermosetting and can include substantial amounts of homopolymerizable ethylenically unsaturated monomers which may be polymerized while setting the polyester.

In an advantageous exemplary procedure for treating a plastic surface, e.g. on a bowling ball cover, an isocyanate, which is preferably an aryldiisocyanate, is reacted with the surface polyester by treating the surface with the isocyanate and subjecting the treated surface to a temperature sufficient to react the isocyanate with the polyester. The reaction is preferably carried out under anhydrous conditions, e.g. under a blanket of dry inert gas as nitrogen, to prevent premature reaction of the isocyanate groups with humidity of the atmosphere. Excess or unreacted isocyanate is then removed from the surface. Removal of unreacted isocyanate can be accomplished conveniently by solvent washing with such solvents as acetone, methylethylketone, diethylketone, benzene, toluene, xylene, carbon tetrachloride, kerosene, nitro-benzene, diethyl ether or the like. Even after removal of unreacted isocyanate by solvent washing, some may remain on or within the surface. The surface then may be "cured," e.g. by heaters at an elevated temperature to complete the reaction of residual unreacted isocyanate, if desired.

In preparing the articles having the isocyanate reaction product, the isocyanate apparently either diffuses into the surface or reacts with carboxyl, hydroxy and other free reactive groups which may be present in the linear polyester, or both. The free carboxyl and/or hydroxy groups are usually terminal groups in the substantially linear polyester; the nature of the terminal groups (e.g. substantially all hydroxy, about half hydroxy and half carboxyl, etc.) may be defined by control of the polyesterification, by blending of differing polyesters, etc. Polyesters with various combinations and ratios of terminal groups are available. The reactions of isocyanate with carboxyls and with hydroxyls, in themselves, are known, as are reactions of isocyanate groups with other terminal groups in other plastics. The reaction with carboxyls proceeds at a faster rate than the reaction with hydroxyls in the absence of a catalyst. Thus, it is advantageous to increase the hydroxyl reaction rate by catalysis. Usable catalysts include the tertiary amines as described by John Burkus, J. Org. Chem., March 1961, pp. 779–780. Also usable are those catalysts described by J. W. Britain and P. G. Gemeinhardt, J. Applied Polymer Science, vol. IV, No. 11, pp. 207–211 (1960), including more specifically triethylenediamine, and the bismuth, lead, tin, strong base, iron antimony, cadmium, cobalt, aluminum, mercury, zinc, and nickel compound catalysts. Many such catalysts also enhance the reaction of carboxyl groups with the isocyanate. However, strong acid conditions tend to suppress the carboxyl-isocyanate reaction and should be avoided for optimum reaction rates.

The surface-hardening reaction product may be in the form of a surface layer having a thickness of the order of magnitude of a molecular layer. Additionally, apparently the isocyanate penetrates into the surface layer of polyester to a substantial depth, e.g. as deep as $1/16$ to $1/8$ inch or deeper, and ecects hardening to varying degrees in the more internal polyester material. Increased hardness has been observed at $1/20$ inch depths and slightly deeper. Thus, where the hardening of a surface or the reaction with a surface is referred to herein, it is fully intended that the surface includes more than the outer molecular layer of plastic or plastic-isocyanate reaction product.

The temperatures used in treating the surface with isocyanate and the temperatures used during the reaction of isocyanate with the plastic are not critical. Treating with isocyanate can be at room temperature or lower if desired but the reaction is preferably carried out at elevated temperatures. For example, a bowling ball may be treated by dipping in liquid phase isocyanate at room temperature and thereafter heated to temperatures above room temperature to increase the reaction rate. Preferably, the isocyanate is in a liquid phase during treating, e.g. in the liquid state where no solvent is used below the isocyanate vaporization temperature. The reaction temperature is not critical, but is sufficient to cause reaction as is evidenced by increased surface wear resistance of the product. As in many reactions, the speed of reaction increases with increased temperature. Thus, the more advantageous temperatures are above ambient room temperature, about 30° C., e.g. above 50° C. The top limit on reaction temperature is the temperature at which polyester or isocyanate is either destroyed or appreciably deteriorated in its characteristics for the particular use. A convenient range is 60° C. to 100° C.

After the reaction, where the isocyanate was not used in solution, it is preferred to remove the unreacted isocyanate, e.g. by washing with suitable solvents. The suitable solvents are non-reactive and capable of subsequent removal from the surface. Such solvents will be apparent to those skilled in the art.

After reacting the surface with isocyanate and before or after removing unreacted isocyanate, the surface may be cured or dried if desired. Curing is particularly advantageous to assure good hardening of the surface and is a preferred procedure. Curing can be effected by baking at elevated temperature, e.g. in a range of the same magnitude as the reacting temperature range and below temperatures which may appreciably degrade or destroy the treated surface reaction product. Usually longer curing times are required at the lower curing temperatures. The curing temperatures for curing reacted surfaces may be considerably lower than those normally advised for curing the polyester itself, e.g. as a cover on a bowling ball.

The following examples are offered for purposes of illustrating our invention only. We do not intend to be limited by such examples.

PREPARATION I

A polyester was made by reacting 2.15 moles of o-phthalic anhydride, 1.05 moles of maleic anhydride and 3.5 moles of propylene glycol until the acid number of the reaction mass was about 34–36. The resulting resin was then cooled to 150° F. and cut with styrene to a resin:styrene ratio of 65:35. The solution of resin in styrene was stabilized with 600 p.p.m. t-butyl catechol. Thereafter 0.025% cobalt naphthenate and 1.0% of a 50% solution of methyl ethyl ketone peroxide in dimethyl phthalate were added. The resin was then poured between two gasketed glass panels and heated in an oven for 2 hours at 58° C. and then 2 hours at 88° C. After thereby curing the polyester casting, the cast panel was removed from between the glass panels and allowed to cool at room temperatures. This panel, or like panels prepared in similar manner, will be referred to herein as "standard" polyester panels.

Example 1

Another panel was prepared in the same manner as Preparation I and, after curing and cooling to room temperature, was placed in a bath containing an 80/20 mixture of 2,4- and 2,6-tolylene-diisocyanates. The temperature of the bath was increased to 75° C. and maintained for about ½ to 2 hours. The plastic panel was then dipped in xylene to wash residual diisocyanate therefrom. The washed panel was then placed in an oven and baked for 4 hours at 100° C.

PREPARATION II

Another panel was prepared in accordance with Preparation I and was placed in an oven at 75° C. for the same period of time as in Example 1. The panel was permitted to cool and then was placed in an oven and baked for 4 hours at 100° C. This panel or like panels will be referred to herein as "cured" standard polyester panels.

The panels of Example 1 and Preparations I and II were each tested for scratch resistance in accordance with the Taber abraser test procedure. In accordance with that procedure, a Taber abraser having attachment E-3720 was used for the purpose of measuring shear hardness. Shear hardness is a quality of a plastic surface to resist digs, scrapes and similar physical damages not classified as normal wear. The abraser attachment consists of a graduated scale beam with a sliding weight for permitting an adjustment in load from zero to 1000 grams. In accordance with the test procedure for making a shear hardness test, a scale beam pivot mounting is adjusted vertically to correspond with the specimen thickness. The graduated beam is then placed in position and aligned with relation to the test specimen which is mounted on the abraser turntable. A cutting edge on the attachment is positioned generally on the specimen after having placed the sliding weight part way along the scale beam for a trial cut. The specimen is then turned slowly and steadily by hand in a counter-clockwise direction. If the tool only scrapes lightly over the top of the specimen, the load is increased. The test groove in a solid plastic specimen may be as wide as 0.150 inch, the maximum practical width for the tool. The most representative groove made by the tool is measured to the nearest mil (0.001 inch) in overall width. The corresponding load in grams indicated on the beam and the width of the groove are used to calculate shear hardness:

Shear hardness =
$$\frac{\text{Load in grams} \times 100}{\text{Width of groove in mils}}$$

The results obtained from testing Preparations I and II and Example 1 in accordance with the foregoing procedure are as follows.

| Specimen: | Shear hardness |
|---|---|
| Preparation I | 400–600 |
| Example 1 | 1800–2400 |
| Preparation II | 800–1000 |

Example 2

Five bowling balls, which had covers molded from a thermosetting resin mixture of propylene glycol, diethylene glycol, fumaric acid, phthalic acid and adipic acid dissolved in styrene (40% of total solution) and containing 0.2% hydroquinone inhibitor, were obtained and three of the balls were treated in a bath of toluene diisocyanate containing 1% stannous octoate at 88° C. for four hours and then cooled. The residual toluene diisocyanate was cleaned from the balls using acetone and the balls were then placed in an oven at a temperature of 88° C. After two hours the balls were removed and permitted to cool to room temperature.

All five bowling balls were then bowled on a bowling lane for twenty lines. During this time both the treated and untreated balls were exchanged between bowlers to minimize possible differences in bowling wear. At the end of the test, the balls were examined for scratches. The treated balls were found to be significantly more scratch resistant than the untreated balls.

Example 3

A glass fiber reinforced laminate was prepared as follows: Two ounces of chopped glass fiber mat were placed on cellophane sheet, and the catalyzed polyester resin as prepared in Example 1 was poured onto the mat in a quantity sufficient to obtain a resin:glass weight ratio of 30:20. Another sheet of cellophane was then placed on top of the glass fiber and resin and air bubbles were removed. The mat was then exposed to 100° C. for 12 hours. After this exposure, for curing purposes, the cellophane was removed leaving a glass fiber reinforced polyester panel. The panel was then cut in two halves and one half was placed in a 50% solution of naphthalene diisocyanate in xylene at 80° C. for 12 hours. The panel was then removed from the solution, cleaned and exposed at 100° C. for 10 hours.

Both the treated and untreated halves of the panel prepared in accordance with Example 3 were tested with a Taber abraser in accordance with the procedure set out above. The results were as follows.

| Specimen: | Shear hardness |
|---|---|
| Panel without treatment | 600–800 |
| Treated panel | 2000–2300 |

It is apparent from the tests of the bowling balls and panels prepared in accordance herewith and in comparison with similar untreated articles, that we have provided new and useful articles having wear resistant surfaces. Bowling balls treated in accordance with this invention have been subjected to normal bowling for the equivalent of one year. Untreated balls were also subjected to normal bowling for the same length of time. There was a significant difference between the treated and untreated balls with respect to wear, scratching and abrasion. The untreated polyester balls exhibited a noticeable typical band containing numerous deep scratches, while the treated balls showed wear which was barely noticeable the scratches being very shallow and short. Additionally, there were many fewer scratches on the treated balls.

In all Examples 4 through 33 given hereinbelow, unless otherwise indicated, wherever Taber wear test results or scratch resistance test results are reported, the tests were conducted generally by the following procedure:

*Taber wear test.*—The instrument used was a Taber abraser, Research Model (Taber Instrument Corporation, North Tonawanda, New York), with CS–17 wheels and 1000 gram auxiliary weights affixed to the abraser arms. Prior to use, new wheels were dressed for 50 cycles of revolutions as indicated on the machine counter by running on Carborundum silicon carbide 220E paper. This dressing was also given the wheels after every 500 cycles of test to even the wheels and to remove any build-up of abraded resin in the wheel surface. Test panel size was 4" x 4" x 0.1" with a 0.25" diameter hole in the center.

After cleaning with cheesecloth, the panel was weighed and mounted on the instrument. Abraser wheels were gently placed on the panel and the turntable started. At frequent intervals during running, the panel was cleared of abraded material by sweeping with a small paint brush. After 500 cylces, the panel was removed gently wiped free of debris and weighed. Before repositioning the test panel, the wheels were dressed as described above. After dressing the wheels were also brushed clear of debris to ready them for the next phase. This procedure was repeated until the total accumulated number of wear cycles 3000. The wear index (Tabor) was then determined by the formula:

Wear index=
$$\frac{\text{Weight loss in milligrams} \times \text{number of cycles in repeated test results}}{\text{Total number of wear cycles}}$$

Thus if 90 milligrams were lost during 3000 cycles of wear test then

Wear index=15 mg./500 cycles=30 mg./1000 cycles
=60 mg./2000 cycles

*Scratch resistance test.*—The instrument used was similar to that described in U.S. Patent No. 2,279,264 and consisted of a wheel supported carriage with accompanying scratching tool. Variation in load imposed on the scratching tool is accomplished by a movable rider on a graduated beam. The beam is graduated from 0–20 with each graduation equalling 100 grams when loaded with the standard rider. The rider is placed at the lower end of the beam scale and with sufficient hand pressure to keep the wheels in contact with the surface to overcome the tendency of the beam and rider to lift the wheels, the tool is drawn across the test surface. Testing is continued by moving the rider along the beam so as to increase the load on the scratching tool until a just perceptible mark is made on the test surface. This method provides a means of obtaining the relative scratch resistance of materials being compared.

*Example 4*

A standard polyester panel was dried for one hour at 80° C. in a forced draught oven and was then surface treated by immersion in Mondur TD–80 at 88° C. for ½ to 1 hour. The panel was then post-cured by oven baking for two hours at 88° C. The Taber wear index of the treated panel was about 13 while the Taber wear index of an untreated or control standard polyester panel was about 40.

The isocyanate may be used in solution in a suitable solvent. The concentration of the solution is not critical; it has already been seen that wear resistance is improved without the use of solvent; also, even very small amounts of isocyanate in solvent are also effective. Preferably, the isocyanate is present in small to major amounts greater than trace amounts. For example, a solution of at least 20%, up to 100%, isocyanate may be conveniently prepared and used, as may lower concentrations, e.g. 10% or less. The usable solvents are those which do not adversely affect the plastic surface to be treated. Hydrocarbon solvents having greater than aromatic saturation, such as the open chain and non-aromatic cyclic hydrocarbons, may be used. These include more particularly the aliphatic hydrocarbons such as pentane, hexane, octane, nonane, decane, etc., and cycloaliphatic hydrocarbons such as cyclopentane, cyclohexane and cycloheptane. Other solvents such as petroleum, petroleum ether, V.M. & P. naphtha and other naphtha type petroleum derivatives are also well suited in addition to the solvents mentioned above. The following Examples 5 through 33 further illustrate the isocyanate reaction step using the isocyanate in solution.

*Examples 5–8*

Where the isocyanate is used in solution, the concentration in solution can be varied as desired. A series of examples were run using toluene diisocyanate (TDI) in cyclohexane as solvent for treatment of cured standard polyester panels. Treatment was at about 80° C. for about ½ to 1 hour. The weight ratio of solvent to isocyanate, the percentage weight gained by treatment and the Taber wear index after treatment is given for each of on series of samples as follows:

| Example | Weight ratio of cyclohexane:TDI | Percent weight gain | Taber wear index, mg. abraded per 2,000 cycles |
|---|---|---|---|
| 5 | 0.5:1.0 | 1.99 | 8.9 |
| 6 | 1.0:1.0 | 1.72 | 8.6 |
| 7 | 2.0:1.0 | 1.25 | 11.0 |
| 8 | 4.0:1.0 | 0.85 | 9.5 |
| Control | Cured standard polyester panel. | 0 | 64.5 |

Although with increased TDI concentration it is seen that a greater percentage weight gain resulted, the differences between Examples 5–8 as to Taber wear index were not great and the ratio of solvent to isocyanate is not believed to be critical.

*Examples 9–12*

Four cured standard polyester panel samples were subjected to the treatment of TDI in cyclohexane (1:1 ratio) for ½ to 1 hour at the temperatures indicated for each example in the table below, with the Taber wear index results shown:

| Example | Temperature, °C. | Percent weight gain | Taber wear index, mg. abraded per 1,000 cycles |
|---|---|---|---|
| 9 | 60 | 1.35 | 9.6 |
| 10 | 80 | 1.55 | 9.1 |
| 11 | 90 | 1.96 | 8.9 |
| 12 | 100 | 2.35 | 9.8 |

Although it may be noted that the weight percent gain increases with higher treatment temperatures, the differences in Taber wear index are apparently not significant.

A series of examples is also given with respect to solvents which may be employed when using the isocyanate in solution in a preferred form of this invention. The solvent is preferably one which does not adversely affect the surface to be treated, e.g. the cured polyester. The solvents which are best suited are those which are less polar than the aromatic hydrocarbon. Accordingly, a series of examples are run using the treating temperatures and times as used in the previous examples, as well as the concentrations of isocyanate in solvent, but substituting for the solvent used, e.g. cyclohexane, the following solvents: pentane, hexane, heptane, octane, nonane, decane, cyclopentane, cycloheptane, petroleum and petroleum-ether. The Taber wear index results are comparable to those given above.

*Examples 13–17*

These examples were prepared using a variety of different isocyanates in 1:1 solution, in cyclohexane solvent, at a treatment temperature of about 80° C. for about ½ to 1 hour, for treating cured standard polyester samples. The identity of the isocyanate, percentage weight gain and Taber wear indexes for these examples were as follows:

| Example | Identity of isocyanate | Percent weight gain | Taber wear index, mg. abraded per 1,000 cycles |
|---|---|---|---|
| 13 | Toluene diisocyanate | 1.85 | 8.8 |
| 14 | 1,5-naphthalene diisocyanate | 1.95 | 11.4 |
| 15 | Mondur CB-75 (triisocyanate) | 5.73 | 26.3 |
| 16 | Bitolylene diisocyanate | 1.54 | 17.8 |
| 17 | Polymethylene polyphenyl-isocyanate. | 1.99 | 12.3 |
| Control | Cured standard polyester | | 46.5 |

*Examples 18–33*

From another series of examples, i.e. 18–33, it was found that the duration of the diisocyanate solution treatment had no appreciable effect on the Taber wear index. In each of Examples 18–33 the isocyanate used was toluene diisocyanate in solvent (1:1 weight ratio isocyanate:solvent) as identified in the table below; the treated surface was a cured polyester sample. Treatment was at the temperatures indicated using the solvents indicated below. After treatment with diisocyanate solution, the sample was permitted to dry at room or elevated temperature and then subjected to post-treatment with water for 16 hours at the temperatures given. The Taber wear indexes (mg. abrasion wear per 1000 cycles) are also given:

| Example | Solvent temperature | Duration of diisocyanate treatment, hr. | Temperature post treatment water, °C. | Taber wear index |
|---|---|---|---|---|
| 18 | Heptane (80° C.) | 0.5 | 26 | 13.9 |
| 19 | do | 1.0 | 26 | 9.1 |
| 20 | do | 3.0 | 26 | 11.6 |
| 21 | Heptane (90° C.) | 0.5 | 26 | 7.9 |
| 22 | do | 1.0 | 26 | 8.9 |
| 23 | do | 3.0 | 26 | 6.8 |
| 24 | Heptane (100° C.) | 0.5 | 26 | 12.5 |
| 25 | do | 1.0 | 26 | 9.8 |
| 26 | do | 3.0 | 26 | 10.1 |
| 27 | Cyclohexane (80° C.) | 0.5 | 27 | 18 |
| 28 | do | 1.0 | 27 | 17 |
| 29 | do | 3.0 | 27 | 18 |
| 30 | do | 5.0 | 27 | 17 |
| 31 | do | 0.5 | 50 | 10.8 |
| 32 | do | 1.0 | 50 | 11.3 |
| 33 | do | 3.0 | 50 | 10.0 |

As further examples, we have treated surfaces of hard rubber with isocyanate and thereafter dried or cured the treated rubber and have obtained improvement in the wear resistance properties thereof as detected by the Taber wear test procedure.

*Example 34*

A cast sheet of polymerized polyester was dried for one hour at 80° C. in a forced draught oven and was then surface treated by immersion in Mondur TD–80 (toluene diisocyanate) at 88° C. for about ½ to 1 hour. The panel was then post-cured by oven baking for two hours at 88° C. The Taber wear index of the treated panel was about 13 while the Taber wear index of an untreated or control panel was about 40.

The reaction of the surface with cross-linking agent is carried out under the usual reaction conditions for reaction of the functional groups involved, i.e. reaction of the functional groups of the cross-linking agent molecule with the isocyanate surface group and preferably with at least two of the surface groups to cross-link the same. As a guide, for example, where the cross-linking agent is a hydroxy compound such as water or polyol, the reaction with isocyanate may be carried out at 20° to 85° C. or higher or lower, in vapor or liquid phase for 5 to 40 hours. These temperatures and times are given merely as a guide and higher or lower temperatures and longer or shorter treating times may be used.

The following examples illustrate the formation of still further improved surfaces by cross-linking the isocyanate treated surface.

*Example 35*

The standard polyester panel as described in Preparation I was immersed in a bath of toluene diisocyanate (TDI) solution (1:1 by weight in cyclohexane). The temperature of the bath was increased to 75° C. and maintained for about 1 hour. The treated standard polyester panel was immersed in water at 50° C. for 16 hours and thereafter oven-baked for 2 hours at 100° C.

*Example 36*

A polymerized polyester test panel as in Example 34 was immersed without preliminary drying for one hour in a 50 percent by weight solution of Mondur TD–80 in cyclohexane at 80° C. for about four hours and thereafter subjected to water vapor at 100° C. for four hours. The panel was then post-cured by baking for two hours at 100° C. The resulting treated panel had a Taber wear index of about 4.3 while the Taber wear index of the untreated control panel was about 34.

*Examples 37–39*

Three polymerized polyester test panels were immersed for 0.5 hour in 50 percent weight solution of Mondur TD–80 in n-heptane at temperatures respectively of 80° C., 90° C., and 100° C. The panels were then immersed and surface-treated in water for sixteen hours at 50° C. and thereafter oven-baked for two hours at 100° C. The Taber wear index of the untreated control was about 65 while the Taber wear indexes for the treated panels were as listed below with the isocyanate treating temperatures shown in parentheses:

Example: Taber wear index
  37 (80° C.) _____ About 13
  38 (90° C.) _____ About 13
  39 (100° C.) _____ About 8

*Example 40*

A cast sheet of polymerized polyester such as used in Example 34 was immersed in a solution of two parts by weight toluene diisocyanate (Mondur TD–80) in one part by weight cyclohexane solvent at 80° C. for one-half hour. The panel was removed from the diisocyanate solution and thereafter immersed in 23° C. water for sixteen hours, and afterwards, oven-baked for two hours at 100° C. The resulting treated panel was found to have a Taber wear index of about 12 while an untreated control panel had a Taber wear index of about 65.

*Example 41*

The procedure of Example 40 was repeated using a solution of one part diisocyanate to four parts cyclohexane solvent in lieu of the solution of Example 40. The resulting treated panel had a Taber wear index of about 14 while that of the control was about 65.

Examples 42–46

In these examples, the procedure generally of Examples 36–41 was followed except that post-curing or drying temperatures and times were varied. A series of five panels was treated for one-half hour in a 50 percent by weight solution of Mondur TD–80 in cyclohexane at 80° C. The panels were then placed in 50° C. water for sixteen hours and were post-cured or dried as indicated below for the times and temperatures indicated:

| Example | Temperature | Time | Taber wear index |
|---|---|---|---|
| 42 | 40° C. (drying) | 2 hrs | 5 |
| 43 | 40° C. (drying) | 4 hrs | 6 |
| 44 | 70° C. (drying) | 4 hrs | 5.5 |
| 45 | 85° C. (oven bake) | 4 hrs | 5 |
| 46 | 100° C. (oven bake) | 4 hrs | 5.5 |
| Standard polyester panel | None | None | 40 |

Example 47

A gel-coated (containing filler) fiberglass reinforced polyester panel was treated for one hour in a 50 percent by weight solution of Mondur TD–80 in cyclohexane at 80° C. The panel was removed from the solution, immersed in 50° C. water for sixteen hours and thereafter post-cured by baking for two hours at 100° C. The Taber wear index of the treated material was about 20 while the untreated control was about 81.

Example 48

A gel-coated fiberglass reinforced laminate was treated for one hour in a 50 percent by weight solution of Mondur TD–80 in cyclohexane at 80° C. The panel was then immersed in 50° C. water for sixteen hours and thereafter post-cured by baking for two hours at 100° C. The Taber wear index of the treated panel was about 24.5 while that of the untreated control was about 86.

Examples 49–63

Using a 1:1 by weight solution of isocyanate in cyclohexane solvent, each of the fifteen cured standard polyester samples prepared as in Preparation I, was surface treated at about 80° C. for the period of time set out in the table below and permitted to dry as in Examples 36–48. The samples were then treated with steam (100° C.) or water (50° C.) as indicated for the period of time set out in the table below. Taber wear indexes were as reported.

| Example | Duration of diisocyanate treatment, hrs. | Post treatment, hrs. Steam | Post treatment, hrs. Water | Taber wear index |
|---|---|---|---|---|
| 49 | 0.5 | 1 |  | 4.3 |
| 50 | 0.5 | 2 |  | 5.2 |
| 51 | 0.5 | 3 |  | 9.1 |
| 52 | 0.5 | 4 |  | 6.1 |
| 53 | 1.0 | 1 |  | 5.6 |
| 54 | 1.0 | 2 |  | 6.1 |
| 55 | 1.0 | 3 |  | 9.6 |
| 56 | 1.0 | 4 |  | 4.1 |
| 57 | 0.5 |  | 1 | 7.1 |
| 58 | 0.5 |  | 3 | 6.6 |
| 59 | 0.5 |  | 6 | 5.5 |
| 60 | 0.5 |  | 9 | 2.0 |
| 61 | 0.5 |  | 12 | 3.9 |
| 62 | 1.0 |  | 3 | 7.8 |
| 63 | 1.0 |  | 9 | 7.3 |
| Standard polyester panel |  | 0 |  | 32.0 |

Examples 64–71

The procedure of Examples 57 to 63 was repeated for eight additional samples except that the water was at the temperature indicated below for each example. Taber wear results are also given:

| Example | Duration of diisocyanate treatment, hrs. | Post treatment water tem., ° C. | Taber wear index |
|---|---|---|---|
| 64 | 0.5 | 26 | 13.9 |
| 65 | 0.5 | 32 | 11.8 |
| 66 | 0.5 | 75 | 10.9 |
| 67 | 0.5 | 100 | 10.9 |
| 68 | 1.0 | 26 | 9.1 |
| 69 | 1.0 | 32 | 9.7 |
| 70 | 1.0 | 75 | 10.0 |
| 71 | 1.0 | 100 | 10.9 |
| Standard polyester panel |  |  | 45 |

Examples 72–78

In each of the above examples, water was used for treatment after the isocyanate treatment. A series of multifunctional compounds was tested to determine the effect on surface hardness or wear resistance in lieu of the water used in the examples above. In each of the Examples 72–78, an isocyanate treated cured polyester sample, the untreated form of which is reported as a control hereinbelow, was further treated by a compound listed below for each example at the temperature given for a period of about 16 hours with the Taber wear results listed.

| Example | Compound | Bath temp., ° C. | Taber abrasion wear after 2,000 cycles |
|---|---|---|---|
| 72 | Ethylene glycol | 80 | 14.5 |
| 73 | 25% aqueous ethylene glycol. | 80 | 8.2 |
| 74 | 50% aqueous trimethylol propane. | 80 | 9.5 |
| 75 | 25% aqueous ethylene glycol. | 50 | 8.2 |
| 76 | 50% aqueous trimethylol propane. | 50 | 11.4 |
| 77 | BF$_3$ in ether | 23 | 17.3 |
| 78 | 47% aqueous hydrazine. | 22 | 31.0 |
| Standard polyester panel. | Untreated |  | 59.6 |

Examples 79–86

In one form of the invention, the treated product preferably after treatment with water, or polyfunctional compound in lieu thereof, is subjected to oven drying or baking. Accordingly, each of the test samples treated as above with isocyanate solution and post-treated with water in the same manner and under the same conditions, was subjected to drying or baking temperatures in an oven for the times given in the table below at the temperatures listed with the Taber abrasion wear results given.

| Example | Hours in oven | Oven temperature | Taber abrasion wear per 500 cycles, mg. abraded |
|---|---|---|---|
| 79 | 0.5 | 55 | 8.1 |
| 80 | 0.5 | 70 | 11.0 |
| 81 | 0.5 | 85 | 12.5 |
| 82 | 0.5 | 100 | 10.8 |
| 83 | 1.0 | 55 | 9.8 |
| 84 | 1.0 | 70 | 12.7 |
| 85 | 1.0 | 85 | 12.0 |
| 86 | 1.0 | 100 | 11.3 |

It will be noted that very little difference in Taber wear results was obtained between the examples and the results appear to indicate that it may be more advantageous to dry at lower temperatures and for less time than to post bake at higher temperatures or for longer times.

As further examples, we have treated surfaces of hard rubber with isocyanate, dried or cured and further treated by immersion in water and have obtained improvement in the wear resistance properties thereof as detected by the Taber wear test procedure.

The improvement in the advantageous form of the present invention wherein the surface is post-treated with water or other agent and dried after the initial treatment with isocyanate is illustrated by a set of four comparative experiments. The experiments were carried out under the same condition for the same phase of treatment to the extent that such treatment was given to each of the polyester panels used. Accordingly, four polyester panels were treated as indicated in the following table with the Taber abrasion resistance results and Gardner scratch resistance results reported below:

| Experiment | Type of panel | Taber Abrasion resistance, mg./1,000 cycles | Scratch resistance, gms. needed to cause scratch |
|---|---|---|---|
| 1 | Standard polyester panel (untreated) | 66 | 5 |
| 2 | Standard polyester panel treated as in Example 1 | 23 | 7 |
| 3 | Standard polyester panel treated as in Example 35 | 7 | 10 |
| 4 | Standard Formica surface | 14 | 9 |

The above results show the improvement in surface scratch resistance in accordance herewith and compared with a Formica surface, one of the most scratch resistant surfaces of a plastic widely used where scratch resistance is desired.

The reaction of isocyanate with the plastic is described herein as being a reaction with the surface plastic or plastic surface. Thus, the resulting reaction product may form a surface layer having a thickness of the order of magnitude of a molecular layer. Additionally, apparently the reactive group composition penetrates into the surface layer of plastic to a substantial depth, e.g. as deep as $1/16$ to $1/8$ inch or deeper, and effects hardening to varying degrees in the more internal plastic material. Increased hardness has been observed at $1/20$ inch depths and slightly deeper. Thus, where the hardening of a surface or the reaction with a surface is refererd to herein, it is fully intended that the surface includes more than the outer molecular layer of plastic or plastic reactive group reaction product.

In order to determine the depth of surface scratch resistance imparted by the present invention, a plastic surface treated in accordance herewith was shaved to a plurality of different depths and the shaved surface tested at the various depths by the Taber wear test. The scratch resistance was present to a depth of about 3 mils and thereafter decreased rapidly. At a depth of 5 mils, for example, the amount abraded per 500 cycles was found to be only slightly less, e.g. about 20%, less than abraded from the corresponding plastic surface alone.

Returning to the drawings, the stippling in FIG. 3 is intended to diagrammatically represent concentration of the wear and abrasion resistance surface material which apparently decreases, as evidenced by a decrease in hardness and scratch resistance, proceeding internally from the outermost polyester surface, in the form of the invention in which the wear and abrasion resistance penetrates to a subsurface depth as is indicated by the stippling.

The surface improvement is applicable to all polyester castings, including not only the molded bowling ball covers and panels of the above specific examples, but also such articles as other playing balls, e.g. billiard balls, which are normally cast or molded as a solid mass of polyester. Improvement is obtained even where terminal hydroxy or carboxy groups are capped, e.g. by esterification with a monohydric alcohol or monobasic acid. The isocyanate has free isocyanate under the conditions of reaction and the reaction with the polyester in physical and/or chemical manner, results in formation of the reaction product, termed polyester organic isocyanate, which improves the surface wear properties, and cross-linking of this product results in still further improvement.

Panels treated in accordance herewith were also found to possess improved tensile strength and resistance to humidity.

All percentages given herein are percentages by weight unless otherwise indicated.

The foregoing detailed description has been given for clearness of understanding only and no unnecessary limitations should be understood therefrom. Some modifications will be obvious to those skilled in the art.

We claim:

1. An article of manufacture having a set solid polyester outer portion in which the polyester is characterized by active hydrogen atoms, and a wear resistant surface on the outer portion, said surface comprising polyester organic isocyanate formed by the reaction of a monomeric organic isocyanate having free isocyanate groups with the polyester of said outer portion.

2. The article of claim 1 wherein said monomeric isocyanate is an aryl polyisocyanate.

3. The article of claim 2 wherein said aryl polyisocyanate is selected from the group consisting of toluene diisocyanate, bitolylene diisocyanate, naphthalene diisocyanate and polymethylene polyphenylisocyanate.

4. The article of claim 1 wherein said reaction product also extends beneath the polyester surface.

5. The article of claim 1 wherein said reaction product is cross-linked polyester organic isocyanate formed by cross-linking said polyester organic isocyanate.

6. A bowling ball as the article of claim 1, said outer portion defining a polyester cover portion of said ball.

7. A billiard ball as the article of claim 1, said outer portion defining the outer portion of a solid spherical polyester mass.

8. A cast polyester panel having a set solid polyester outer portion in which the polyester is characterized by active hydrogen atoms, and a wear resistant surface on the outer portion, said surface comprising polyester organic isocyanate formed by the reaction of a monomeric organic isocyanate having free isocyanate groups with the polyester of said outer portion.

9. The casting of claim 8 wherein said casting includes glass fibers reinforcing said polyester.

10. A rigid polyester casting having a set solid polyester outer portion in which the polyester is characterized by active hydrogen atoms, said outer portion having a wear and scratch resistant surface layer extending interiorly into the polyester of said outer portion and consisting essentially of the cured polyester organic isocyanate reaction product formed by in situ reaction of the surface and subsurface polyester of said outer portion with a monomeric organic isocyanate applied thereto in a form having all isocyanate groups free for reacting with the surface end subsurface polyester followed by curing, said wear resistant surface extending interiorly from the surface of the outer portion to a depth of at least about 3 mills within the polyester and decreasing in wear resistance within said outer portion.

11. A ball having a polyester outer structure, the polyester of said structure being characterized by active hydrogen atoms, said structure having a wear resistant surface comprising polyester organic isocyanate formed by the reaction of a monomeric organic isocyanate with the polyester of said outer portion.

12. A ball having a polyester outer structure, the polyester of said structure being characterized by active hydrogen atoms, said structure having a wear resistant surface consisting of the reaction product of the polyester surface and a member selected from the group consisting of aryl and alkyl monoisocyanates and polyisocyanates.

13. A bowling ball having a polyester outer portion in which the polyester is characterized by active hydrogen atoms, and a wear resistant surface on the outer portion, said surface comprising polyester organic isocyanate formed by the reaction of a monomeric organic isocyanate with the polyester of said outer portion.

14. The bowling ball of claim 13 wherein said monomeric organic isocyanate is an aryl polyisocyanate.

15. The bowling ball of claim 14 wherein said aryl polyisocyanate is selected from the group consisting of toluene diisocyanate, bitolylene diisocyanate, naphthalene diisocyanate, and polymethylene polyphenylisocyanate.

16. A bowling ball having a polyester outer portion in which the polyester is characterized by active hydrogen atoms, said outer portion having a wear resistant surface consisting of the reaction product of the polyester surface and a member selected from the group consisting of aryl and alkyl monoisocyanates and polyisocyanates.

17. The bowling ball of claim 16 wherein said reaction product also extends beneath the polyester surface.

18. A polyester casting having a set solid polyester outer portion in which the polyester is characterized by active hydrogen atoms, and a wear resistant surface on the outer portion, said surface comprising cross-linked polyester organic isocyanate reaction product formed by reacting a monomeric organic isocyanate having free isocyanate groups with the polyester of said outer portion and cross-linking the resulting reaction product.

19. An article of manufacture having an outer portion consisting essentially of a set solid polyester base in which the polyester is characterized by active hydrogen atoms, said outer portion having a wear and scratch resistant surface layer extending interiorly into the polyester of said outer portion and consisting essentially of the cured cross-linked polyester-isocyanate reaction product of in situ reaction of the surface and subsurface polyester of said outer portion with a monomeric organic isocyanate applied thereto in a form having all isocyanate groups free for reaction and a cross-linking agent reacted in situ with the isocyanate, said wear resistant surface penetrating at least one mil interiorly and decreasing in scratch resistance within said outer portion to merge with the polyester interior.

20. The article of claim 19 wherein said cross-linking agent is water.

21. The article of claim 19 wherein said cross-linking agent is ethylene glycol.

22. The article of claim 19 wherein said cross-linking agent comprises boron trifluoride.

23. The article of claim 19 wherein said cross-linking agent comprises trimethylol propane.

24. The article of claim 19 wherein said cross-linking agent comprises hydrazine.

25. A rigid polyester casting having a set solid polyester outer portion in which the polyester is characterized by active hydrogen atoms, said outer portion having a wear and scratch resistant surface layer extending interiorly into the polyester of said outer portion and consisting essentially of the cross-linked polyester organic isocyanate reaction product formed by in situ reaction of the surface and subsurface polyester of said outer portion with a monomeric organic isocyanate applied thereto in a form having all isocyanate groups free for reaction with the surface and subsurface polyester followed by in situ cross-linking of the resulting polyester organic isocyanate reaction product by reaction with a cross-linking agent, said wear resistant surface extending interiorly from the surface of the outer portion to a depth of at least about one mill within the polyester.

26. A bowling ball having a polyester outer portion in which the polyester is characterized by active hydrogen atoms, and a wear resistant surface on the outer portion, said surface comprising cross-linked polyester organic isocyanate reaction product formed by reacting a monomeric organic isocyanate with the polyester of said outer portion and cross-linking the resulting reaction product.

27. A polyester panel having a set solid polyester outer portion in which the polyester is characterized by active hydrogen atoms, and a wear resistant surface on the outer portion, said surface comprising cross-linked polyester organic isocyanate reaction product formed by the reaction of a monomeric organic isocyanate having free isocyanate groups with the polyester of said outer portion and cross-linking the resulting reaction product.

References Cited by the Examiner

UNITED STATES PATENTS

| | | |
|---|---|---|
| 2,625,532 | 1/1953 | Seeger. |
| 2,657,151 | 10/1953 | Gensel et al. |
| 2,723,935 | 11/1955 | Rodman. |
| 2,760,953 | 8/1956 | Seeger _____ 260—75 |
| 2,778,810 | 1/1957 | Muller et al. |
| 2,866,722 | 12/1958 | Gensel et al. _____ 117—62.2 |
| 2,929,737 | 3/1960 | Tischbein. |
| 2,938,823 | 5/1960 | Salem et al. |
| 2,955,954 | 10/1960 | Collins _____ 117—138.8 |
| 2,970,066 | 1/1961 | Brasure _____ 117—138.8 |
| 3,000,757 | 9/1961 | Johnston et al. _____ 117—138.8 |
| 3,013,906 | 12/1961 | Flowers _____ 117—118 |
| 3,027,343 | 3/1962 | Kane _____ 117—138.8 |
| 3,030,223 | 4/1962 | Alstad et al. _____ 117—138.8 |
| 3,068,007 | 12/1962 | Satchell _____ 273—63 |
| 3,099,642 | 7/1963 | Holtschmidt et al. ___ 260—75 |
| 3,102,835 | 9/1963 | White _____ 117—62.2 |

OTHER REFERENCES

Dombrow: "Polyurethanes," Reinhold Pub. Corp., New York, 1957, pp. 26, 27, 145, 146.

WILLIAM D. MARTIN, *Primary Examiner.*

H. W. MYLIUS, *Assistant Examiner.*